(12) United States Patent  (10) Patent No.:  US 6,423,357 B1
Woods et al.  (45) Date of Patent:  Jul. 23, 2002

(54) EDIBLE CUP AND METHOD OF MAKING SAME

(76) Inventors: Raymond Woods, 1501 Girard Ave. North, Minneapolis, MN (US) 55411; Deborah Martel, 4541 York Ave. South, Minneapolis, MN (US) 54410

(*) Notice: Subject to any disclaimer, the term of this patent is extended or adjusted under 35 U.S.C. 154(b) by 0 days.

(21) Appl. No.: 09/488,097

(22) Filed: Jan. 18, 2000

(51) Int. Cl.⁷ .................................................. A23P 1/00
(52) U.S. Cl. ....................... 426/138; 426/104; 426/274; 426/390; 426/640
(58) Field of Search ................................ 426/138, 139, 426/76, 102, 106, 115, 274, 279, 282, 549, 573, 640, 89, 104, 390

(56) References Cited

U.S. PATENT DOCUMENTS

| | | | |
|---|---|---|---|
| 480,687 A | * 8/1892 | Beaumount | 426/138 |
| 575,206 A | * 1/1897 | Britton | |
| 1,509,194 A | * 9/1924 | Dresser | 426/76 |
| 2,167,353 A | * 7/1939 | Frediani | 426/102 |
| 4,205,091 A | 5/1980 | Van Horne | 426/138 |
| 4,251,551 A | 2/1981 | Baisden | 426/128 |
| 4,313,964 A | 2/1982 | Dembecki | 426/138 |
| 4,390,553 A | 6/1983 | Rubenstein et al. | 426/138 |
| 4,603,051 A | 7/1986 | Rubenstein et al. | 426/138 |
| D295,570 S | 5/1988 | Muello | D1/116 |
| 4,749,583 A | 6/1988 | Branch | 426/549 |
| 4,795,652 A | 1/1989 | Cooper | 426/549 |
| 4,847,098 A | 7/1989 | Langler | 426/102 |
| 4,853,236 A | 8/1989 | Langler | 426/102 |
| 4,861,603 A | * 8/1989 | Saito et al. | 426/93 |
| 4,919,946 A | 4/1990 | Pak et al. | 426/89 |
| 4,927,656 A | 5/1990 | Ito | 426/549 |
| 5,002,783 A | 3/1991 | Ruiz | 426/138 |
| 5,128,157 A | 7/1992 | Ruiz | 426/106 |
| 5,188,861 A | 2/1993 | Mazin et al. | 426/640 |
| 5,194,272 A | 3/1993 | Munk et al. | 426/94 |
| 5,223,286 A | 6/1993 | Selbak | 426/94 |
| 5,284,672 A | 2/1994 | Ito | 426/549 |
| 5,298,273 A | 3/1994 | Ito | 426/549 |
| 5,304,386 A | 4/1994 | Dugas et al. | 426/94 |
| 5,346,710 A | 9/1994 | Geitner | 426/115 |
| 5,352,111 A | 10/1994 | Selbak | 425/351 |
| 5,378,418 A | 1/1995 | Berger et al. | 264/83 |
| 5,425,527 A | 6/1995 | Selbak | 249/122 |
| 5,518,748 A | 5/1996 | Ito | 426/499 |
| 5,533,439 A | 7/1996 | Ito | 99/383 |

(List continued on next page.)

FOREIGN PATENT DOCUMENTS

| | | | | |
|---|---|---|---|---|
| CA | 832965 A | * | 6/1970 | |
| DE | 4212306 A | * | 4/1992 | B65D/65/46 |
| DE | 4319452 A | * | 6/1993 | A23G/1/00 |
| DE | 4218392 A | * | 12/1993 | |
| EP | 1044613 A2 | * | 10/2000 | |
| FR | 2596958 A | * | 4/1986 | A23L/1/21 |
| GB | 865615 | * | 4/1961 | |
| JP | 361037058 A | * | 2/1986 | |
| JP | 62224253 A | * | 3/1986 | A23L/1/21 |
| JP | 405254571 | * | 10/1993 | |
| JP | 2000270803 A | * | 3/1999 | A23L/1/00 |
| WO | WO 9620604 | * | 7/1996 | |
| WO | WO-9745028 | * | 12/1997 | |

*Primary Examiner*—Milton I. Cano
*Assistant Examiner*—Robert A. Madsen
(74) *Attorney, Agent, or Firm*—Dorsey & Whitney LLP

(57) ABSTRACT

The present invention includes an edible container that can hold and contain medium and low viscosity liquids for extended periods of time. One embodiment of the present invention comprises an edible dehydrated food sheet formed into a vessel capable of holding liquid for extended periods of time without leakage and capable of being hand-held, an opening in said container for receiving liquids, and a flat base capable of stabilizing said container in an independent upright position. The dehydrated food sheet may be formed from dehydrated fruit or dehydrated vegetable material.

10 Claims, 5 Drawing Sheets

U.S. PATENT DOCUMENTS

| | | |
|---|---|---|
| 5,626,897 A | 5/1997 | Goldstein ................... 426/139 |
| 5,639,518 A * | 6/1997 | Ando et al. .................. 427/544 |
| D386,885 S | 12/1997 | Bell ............................ D1/116 |
| 5,723,163 A | 3/1998 | Zimmermann et al. ..... 426/106 |
| 5,753,284 A | 5/1998 | Green et al. .................. 426/85 |
| 5,792,470 A | 8/1998 | Baumgardner, Sr. ........ 424/442 |
| 5,840,354 A | 11/1998 | Baumann et al. ............. 426/74 |
| D404,536 S * | 1/1999 | Hepworth .................... D1/122 |
| D405,936 S * | 2/1999 | Kojima ........................ D1/117 |
| 5,882,710 A | 3/1999 | Jury ............................ 426/512 |
| 5,916,611 A | 6/1999 | Bell ............................ 426/95 |
| 6,068,866 A * | 5/2000 | Petrini et al. .................. 426/94 |

* cited by examiner

EDIBLE CUP AND METHOD OF MAKING SAME

BACKGROUND

1. Field of the Invention

This present invention relates to containers for holding and containing liquid food products for consumption. More particularly, the present invention relates to an edible cup capable of holding and containing low viscosity liquids, such as water, soda pop, milk, and the like, for extended period of time.

2. Description of the Prior Art

Edible food containers are commonly used to serve solid and highly viscous liquid products. For example, ice cream is commonly served in edible wafer and sugar cones. These edible containers are generally formed by pouring liquid waffle dough into a mold or by forming a single sheet of dough into a cone shape.

U.S. Pat. No. 5,626,897 to Goldstein et al. ("Goldstein") discloses another edible food container. This container is formed by wrapping an elongate strip of uncooked bread dough around a conically-shaped mandrel to form a plurality of spiral turns with an overlap between adjacent turns of the spiral. The resultant uncooked dough cone is then baked to form an edible, cone-shaped container of soft bread. After the bread cone is removed from the mandrel, the hollow interior may be filled with a selected filling.

One problem with these conventional edible containers is that they cannot hold low viscosity liquids for extended periods of time. That is, conventional edible containers, such as wafer cones and sugar cones, are too porous to contain, and eventually deteriorate when exposed to, a medium or low viscosity liquid. An edible container capable of holding medium and low viscosity liquids for extended periods of time would be ecologically desirable because it could reduce the amount of packaging material entering landfills and because it could reduce the amount of litter left at fairs, concerts, and other large events. Another problem with some conventional edible containers is that they must be continuously supported. That is, a user cannot set the container in an upright position on a flat surface.

Accordingly, there is a need for an edible cup made that can hold and contain medium and low viscosity liquids for extended periods of time. In addition, there is also a need for an edible container that can be set upright on a flat surface without support.

SUMMARY

The present invention provides an edible container that can hold and contain low viscosity liquids for extended periods of time. The present invention also provides an edible container that may be set upright on a flat surface without support. One aspect of the present invention is a watertight, edible container. One embodiment of this edible container comprises an edible dehydrated food sheet formed into a vessel capable of holding liquid for extended periods of time without leakage and capable of being hand-held; an opening in said container; and a flat base capable of stabilizing said container in an independent upright position. The dehydrated food sheet may be formed from dehydrated fruit or dehydrated vegetable and may include a handle and a lid.

Another aspect of the invention is a method of producing a watertight edible container. One embodiment of this method comprises the act of forming a dehydrated food sheet into a flat-based vessel, said container having an opening and being capable of holding liquid for extended periods of time without leakage. The act of producing a watertight edible container may comprise the acts of forming the flat base from a dehydrated food material, wherein said base has a peripheral edge directed upwards; folding a second sheet of edible dehydrated food, said second sheet having a creased edge and two wing edges; placing said second sheet above said base, with said wing edges of said second sheet in overlapping position on opposite sides of peripheral edge of said base; and creating a watertight interlocking seal by applying pressure and moisture to said wing edges of said second sheet and said peripheral edge of said base.

Accordingly, it is an object of the invention to provide an edible cup made that can hold and contain low viscosity liquids for extended periods of time.

It is also an object of the invention to provide an edible food container that can sit upright on a flat surface without a support means.

It is also an object of the invention to provide a method of forming a dehydrated food sheet into a flat-based edible container.

It is also an object of the invention to provide a handle and a lid for an edible container.

It is also an object of the invention to provide an edible fluid conveyance apparatus capable of transporting low viscosity liquids for extended periods of time.

These and other objects, features, and advantages will become better understood with reference to the following description, appended claims, and accompanying drawings.

DETAILED DESCRIPTION

Figure 1:
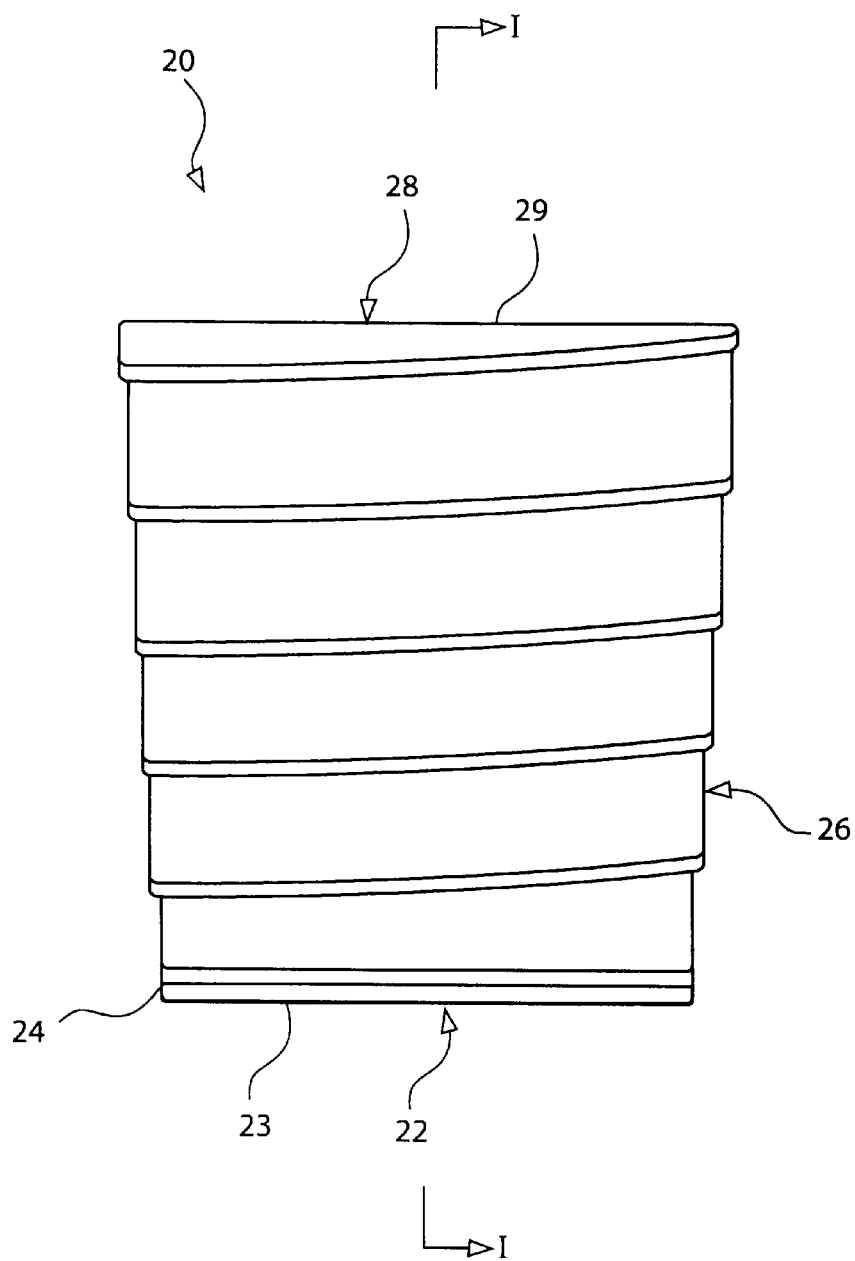
FIG. 1 is a side plan view of one edible container embodiment.

FIG. 1 is a side plan view of one edible container embodiment 20. This edible container 20 comprises a generally circular base 22, tubular side walls 26, and a circular top opening 28 having a rim 29 that is generally parallel with the bottom surface 23. The base 22 in this embodiment comprises a flat bottom surface 23 and a raised peripheral edge 24, and cooperates with the walls 26 to form a cavity 30 (see FIG. 2) that can hold and contain low viscosity fluids, such as milk, soda pop, water, and the like, for extended periods of time.

In operation, a user can pour a low viscosity liquid into the cavity 30 through the circular top opening 28. The container 20 will hold this liquid for an extended period of time without leaking. During this time, the user can set the container 20 down on a flat surface (not shown). The flat bottom surface 23 will hold the container 20 in an independent upright position.

Figure 2:
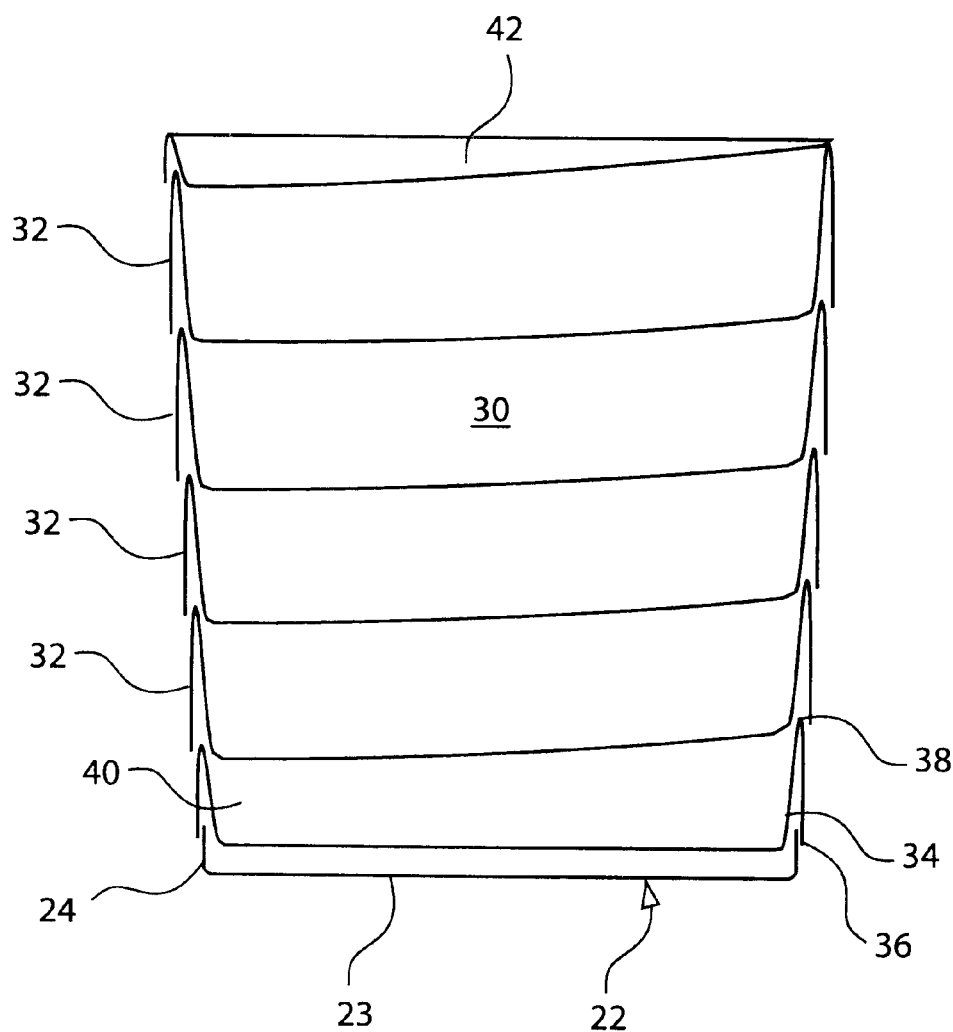
FIG. 2 is a sectional view taken along the line AA in FIG. 1.

FIG. 2 is a sectional view of the embodiment in FIG. 1. This figure shows that the generally tubular side walls 26 comprise a relatively narrow, elongate strip 32 that has been spirally wrapped into a tube-like configuration. The strip 32 in this embodiment has two wing edges 34 and 36, a central crease 38, and two ends 40 and 42. The central crease 38 is generally parallel to both wing edges 32 and 34. Each end 40 and 42 of the strip 32 is slightly tapered, which aids in starting and stopping the spiral wrappings.

The strip 32 in this embodiment is made from a pureed and dehydrated fruit or vegetable product that has been formed into a thin sheet, such as that made by General Mills, Inc. of Minneapolis, Minnesota under the trademark Fruit Roll-ups®. These embodiments are desirable because the dehydrated fruit or vegetable sheet material is water resistant, nutritious, sweet, and flavorful. However, strips 32 made from other water resistant and/or hydrophobic food materials are also within the scope of the present invention. This specifically includes, without being limited to, the food materials described in U.S. Pat. Nos. 5,840,354 to Baumann et al.; U.S. Pat. No. 4,847,098 to Langler; U.S. Pat. No. 4,853,236 to Langler; and U.S. Pat. No. 5,188,861 to Mazin, which are each herein incorporated by reference.

The dehydrated fruit or vegetable material may be formed into the strips 32 in any suitable manner, such as cutting the pre-made sheets of the dehydrated material into appropriately sized and shaped pieces. Alternatively, the pureed fruit or vegetable paste could be extruded in the appropriate size and then dehydrated, or made using the methods described in U.S. Pat. No. 5,723,163 to Zimmermann et al., which is herein incorporated by reference.

One method of forming the container 20 in FIGS. 1 and 2 begins by forming the peripheral edge 24 and the flat bottom surface 23 in the base member 22. This can accomplished by any suitable method, such as molding or forming processes. Next, the precut strip 32 is folded lengthwise, which brings its wing edges 32, 34 into close proximity. The folded strip 32 is then wrapped around the base member 22 such that both wing edges 32, 34 slightly overlap the peripheral edge 24 on opposite sides. That is, the peripheral edge 24 is inserted in-between the two wing edges 32, 24 while the strip is wrapped around base 22. A watertight seal is then created between the peripheral edge 24 and the strip 32 by pressing the wing edges 32, 24 and the peripheral edge 24 together.

After completing the first layer, the manufacturer may continue to spirally wrap the strip 32 around itself, or may begin to spirally wrap additional strips 32, until the desired height is reached. In either case, the wing edges 32, 34 of each upper layer should overlap, on opposite sides, the creased edge 38 of the adjacent lower layer.

Various modifications of this basic method are within the scope of the present invention. For example, the wing edges 32, 34 and the peripheral edge 24 may be moistened before wrapping. This will soften the dehydrated material, which may help to create the watertight seal. Also, the strip 32 may be wrapped around a removable mandrel or a die (not shown). These embodiments are desirable because the mandrel or die will help to shape the container 20 into a right-cylinder or a right-truncated cone shape. In still other embodiments, the dehydrated fruit or vegetable material may be wrapped inside or around a relatively stiff bread-based material, such as a cookie or cracker, or crystalized sugar-based product. These embodiments may be desirable because the bread or crystalized sugar based material will stiffen the side walls 26 of the edible container 20. In addition, the walls 26 may comprise several folded rings dehydrated material, rather than strips of dehydrated material.

Figure 3:
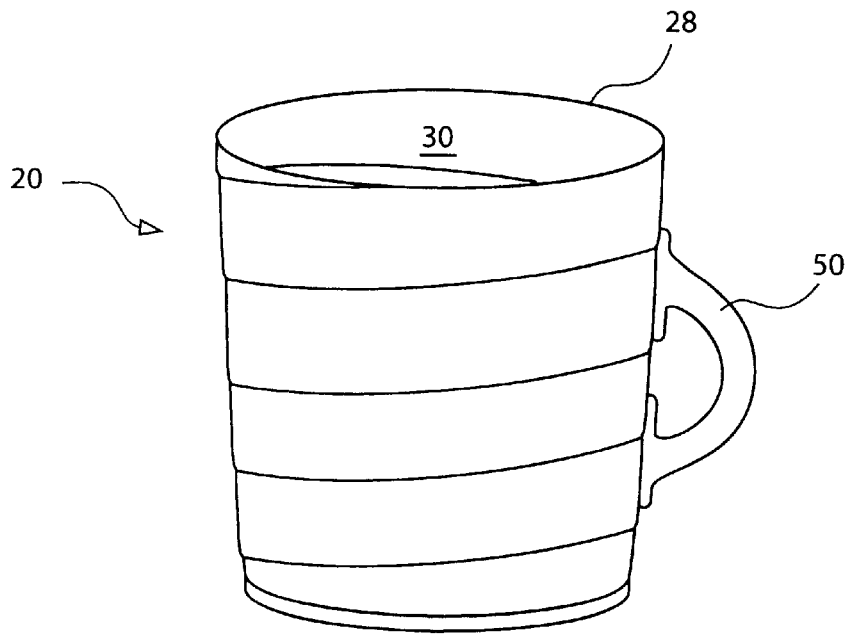
FIG. 3 is an isometric view of one edible container embodiment having a handle.

FIG. 3 is an isometric view of one edible container embodiment having a handle 50. The handle 50 in this embodiment may be formed by wrapping strips 32 of dehydrated food material around a relatively stiff support member, such as a bread or crystalized sugar-based product. Handles 50 made from other edible and non-edible materials are also within the scope of the present invention. Non-edible handles 50 may be particularly desirable because the user can drink from the cup 20 without having to touch its edible portions.

Figure 4:
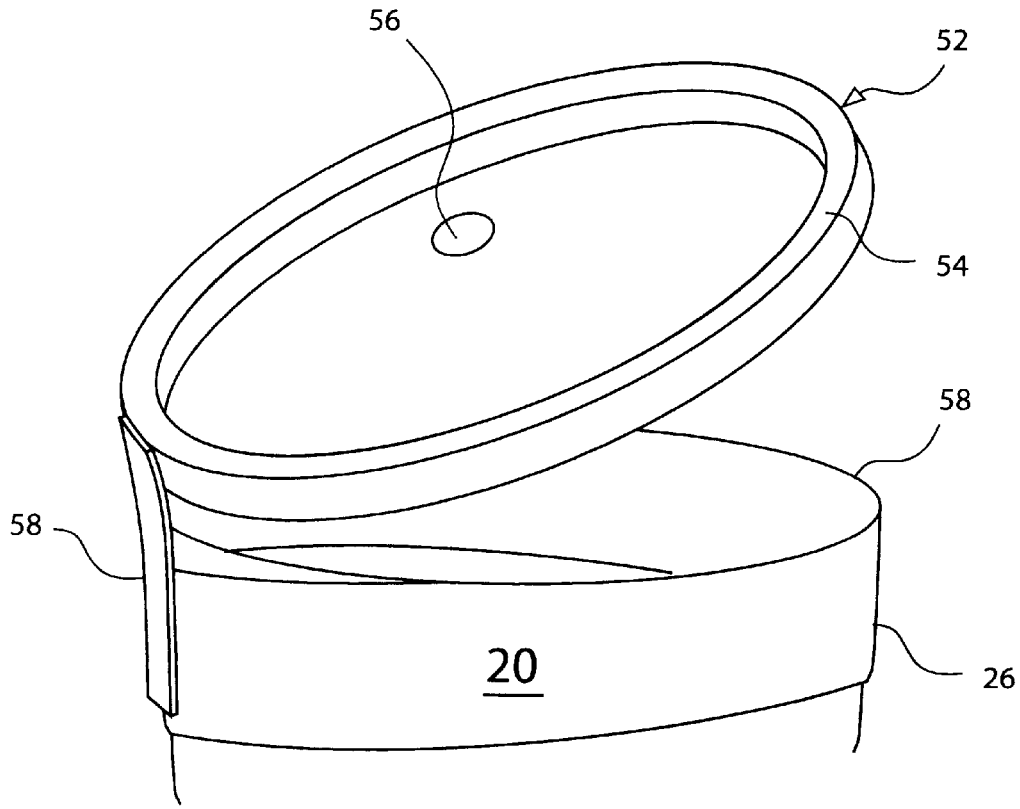
FIG. 4 is an isometric view of one edible container embodiment having a lid.

FIG. 4 is an isometric view of one edible container embodiment having a lid 52 made from dehydrated food material. The lid 52 in this embodiment has a structured peripheral rim 54, a hole 56 located inside the peripheral rim, and a living hinge 56. In operation, the lid 52 pivots around the living hinge 56 into and out of engagement with a top edge 58 of the side walls 26. The structured peripheral rim 54 grips the top edge of the side walls 26 and helps to prevent the lid 52 from unexpectedly falling off the container 20. The hole 56 permits insertion of an straw, such as that shown in FIG. 5, and is desirable because the user can drink the container's contents while the lid 52 is attached.

Figure 5:
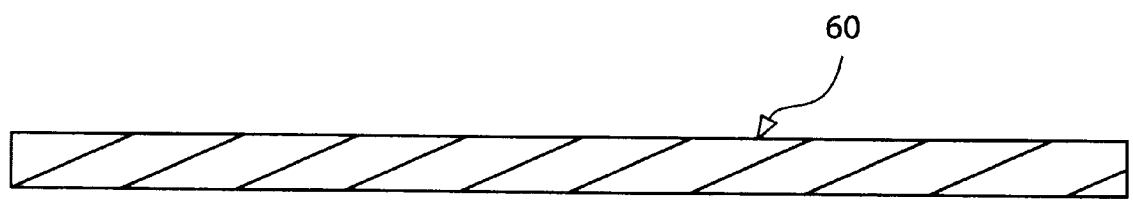
FIG. 5 is side plan view of one edible straw embodiment.

FIG. 5 is a side plan view of one edible straw embodiment 60. This edible straw 60 is made from spirally wrapped strips of waterproof food material. This edible straw 60 may be formed using a removable mold and may include a edible stiffener. In other embodiments, the edible straw 60 is made from a seamless, single piece of waterproof food material that has been molded or extruded into the desired shape.

Figure 6:
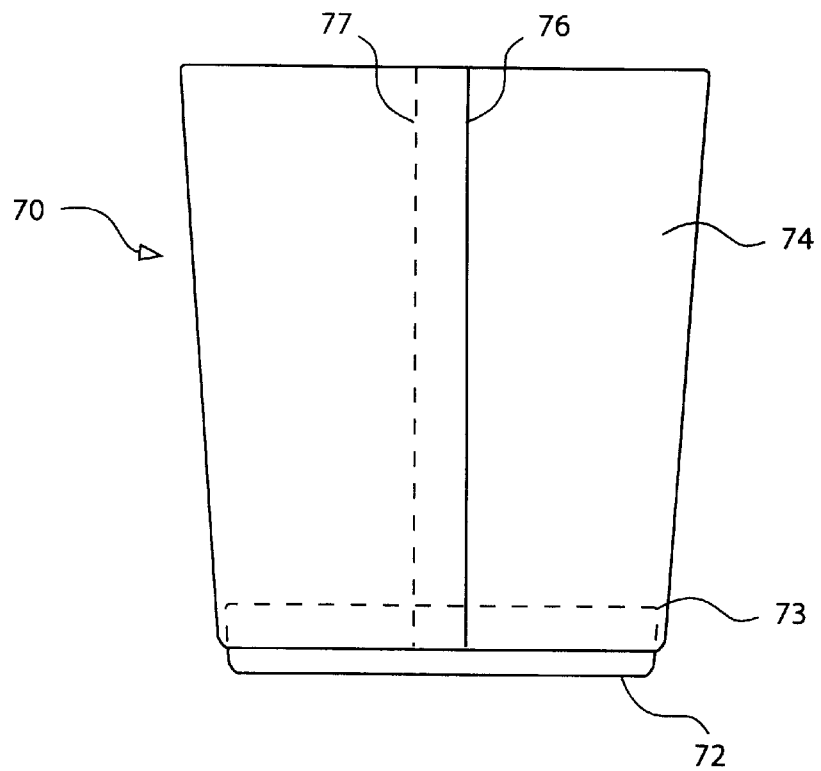
FIG. 6 is a side plan view of an alternate edible container embodiment.

FIG. 6 is a side plan view of an alternate edible container embodiment 70. This embodiment 70 comprises a generally circular base 72 having a raised peripheral edge 73 (partially depicted using hidden lines) and a generally rectangular or trapezoidal wall sheet 74. The wall sheet 74 in this embodiment is wrapped around a mandrel (not shown) so that its ends 76, 77 overlap slightly. The ends 76 and 77 are then sealed together, thereby forming a cylindrical tube with a single, generally vertical seam 78. The tube of edible food material may then be attached to the base 72 by any suitable method. These embodiments may be desirable because they require a shorter seam than the embodiment described with reference to FIGS. 1 and 2.

Figure 7:
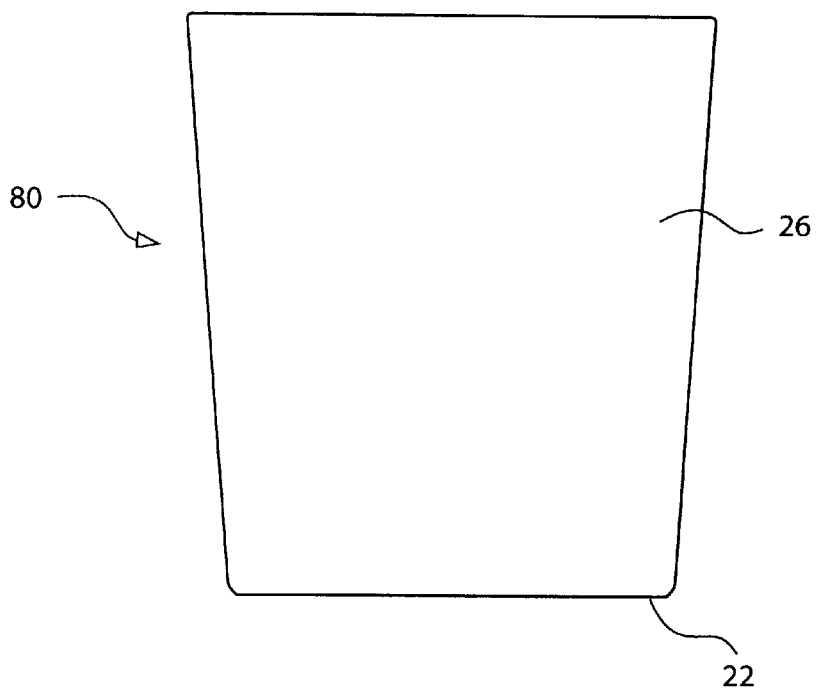
FIG. 7 is a side plan view of a seamless edible container embodiment.

FIG. 7 is a side plan view of another alternate edible container embodiment 80 in which the walls 26 and the base 22 are formed simultaneously from a single piece of waterproof food material using injection molding techniques. That is, the waterproof food material is injected into a mold cavity in liquid form and allowed to solidify into the appropriate shape inside the mold. These embodiments may be desirable because they would not require any seams.

The previously described embodiments of the present invention have many advantages over known edible containers. For example, the edible cup 20 can hold low viscosity liquids for extended periods of time and sit upright on a flat surface without outside support means. In addition, the present invention provides its consumer with a sweet and high-energy dessert in addition to its liquid or solid contents. This feature may make the present invention particularly desirable to children and to participants at sporting events.

Those skilled in the art will recognize that the present invention may be embodied in other specific forms without departing from the essential spirit or attributes thereof. For example, the dehydrated food material may be coated with a sugar glaze to help stiffen the side walls 26 or with shortening to improve the water resistivity of its side walls 26. In addition, the edible container may include struts or other stiffening members that will also improve the container's stiffness, or may be formed into a generally conical shape. Also, the present invention may use an edible adhesive material to help seal together its various components.

Those skilled in the art will also recognize that any references to front and back, right and left, top and bottom and upper and lower were intended for convenience of description, not to limit the present invention or its components to any one positional or spacial orientation. Thus, it is desired that the embodiments described herein be considered in all respects as illustrative, not restrictive, and that reference be made to the appended claims for determining the scope of the invention.

What is claimed is:

1. A watertight, edible container, comprising
   (a) an edible dehydrated food sheet formed into a vessel capable of holding liquid for extended periods of time without leakage and capable of being hand-held;
   (b) an opening in said container; and
   (c) a flat base capable of stabilizing said container in an independent upright position, wherein said flat base has a peripheral edge directed upwards;
   and further comprising:
      at least one folded sheet of edible dehydrated food, said folded sheet having a creased edge and two wing edges; and
      a watertight interlocking seal between said base and first said folded sheet, wherein said first folded sheet is located above said base and wherein said seal is comprised of both said wing edges of said first folded sheet attached on opposite sides of said peripheral edge of said base, wherein said wing edges of said first folded sheet are in contact with said opposite sides of said peripheral edge of said flat base along the entire said peripheral edge of said flat base.

2. The container of claim 1, wherein a further said watertight interlocking seal exists between said first folded sheet and a second said folded sheet, wherein said folded second sheet is located above said first folded sheet and wherein said seal is comprised of both said wing edges of said second folded sheet attached on opposite sides of said creased edge of said first folded sheet, wherein said wing edges of said second sheet are in contact with said opposite sides of said creased edge of said first folded sheet along the entire said creased edge of said first folded sheet.

3. The container of claim 2, wherein further said watertight interlocking seals exist between further said folded sheets, wherein said further watertight interlocking seals and said further folded sheets are constructed in like manner to said first sheet and said second sheet and said watertight interlocking seal between said first sheet and said second sheet.

4. The container of claim 3, wherein said interlocking seals are cemented by moisture and pressure.

5. The container of claim 1, wherein said sheets are selected from the group consisting of dehydrated fruit and dehydrated vegetables.

6. The container of claim 1, further comprising a handle member comprised of edible material attached to the container.

7. The container of claim 1, further comprising a lid member comprised of edible material attached to the container.

8. A method of producing a watertight edible container comprising the act of forming a dehydrated food sheet into a flat-based vessel, said container having an opening and being capable of holding liquid for extended periods of time without leakage, wherein the act of producing a watertight edible container comprises the steps of:
   (a) forming said flat base, wherein said base has a peripheral edge directed upwardly and said base is comprised of a first sheet of edible dehydrated food;
   (b) folding a second sheet of edible dehydrated food, said second sheet having a creased edge and two wing edges;
   (c) placing said second sheet above said base, with said wing edges of said second sheet in overlapping position on opposite sides of peripheral edge of said base, wherein said wing edges are in contact with said opposite sides of said peripheral edge of said flat base along the entire said peripheral edge of said flat base; and
   (d) creating a watertight interlocking seal by applying pressure and moisture to said wing edges of said second sheet and said peripheral edge of said base.

9. The method of claim 8, wherein the act of producing a watertight edible container further comprising the steps of:
   (i) folding a third sheet of edible dehydrated food, said third sheet having a creased edge and two wing edges;
   (ii) placing said third sheet above said second sheet, with said wing edges of said third sheet in overlapping position on opposite sides of creased edge of said second sheet, wherein said wing edges of said third sheet are in contact with said opposite sides of said creased edge of said second sheet along the entire said creased edge of said second folded sheet;
   (iii) creating a watertight interlocking seal by applying pressure and moisture to said wing edges of said third sheet and said creased edge of said second sheet.

10. The method of claim 9, wherein steps (i), (ii), and (iii) are repeated with a plurality of sheets of edible dehydrated food.

* * * * *